United States Patent Office 3,186,958
Patented June 1, 1965

3,186,958
POLYMERIZATION OF EPOXIDES
Abraham Kutner, Newark, and Edwin J. Vandenberg,
Wilmington, Del., assignors to Hercules Powder Company, Wilmington, Del., a corporation of Delaware
No Drawing. Filed June 29, 1961, Ser. No. 120,491
21 Claims. (Cl. 260—2)

This invention relates to a new process for polymerizing epoxides and, more particularly, to a process for polymerizing epoxides with a catalyst formed by mixing a hydrocarbonaluminum compound with a basic nitrogen-containing compound.

In accordance with this invention it has been discovered that epoxides can be polymerized to high molecular weight polymers by using as a catalyst a hydrocarbonaluminum compound that has been reacted with less than one equivalent of ammonia, amine or other organic basic nitrogen-containing compound. The amount of the nitrogen-containing compound that is reacted with the hydrocarbonaluminum compound is critical and should be such that the molar ratio of nitrogen to aluminum is within the range of from about 0.01 to about 0.95 and preferably is within the range of from about 0.05 to about 0.5. By carrying out the polymerization in accordance with this invention it has been found that the conversion and/or rate of polymerization, and/or yield are greatly improved over the process when a hydrocarbonaluminum compound that has not been reacted with the nitrogen-containing compound is used as the catalyst. In addition, the polymerization reaction is readily carried out at room temperature or below, thus obviating pressure equipment, etc.

Any epoxide may be homopolymerized or copolymerized with a second epoxide by the process of this invention. Outstanding results are obtained with ethylene oxide, mono-substituted ethylene oxides

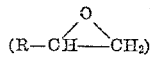

symmetrically di-substituted ethylene oxides

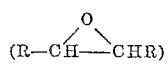

where R is a hydrocarbon radical such as alkyl, aryl, cycloalkyl, etc., and halogen-containing epoxides. Exemplary of these epoxides that may be homopolymerized or copolymerized are the alkylene oxides such as ethylene oxide, propylene oxide, 1-butene oxide, 2-butene oxides, isobutylene oxide, 1-hexene oxide, and substituted alkylene oxides such as cyclohexene oxide, styrene oxide, glycidyl ethers of phenol, bis-phenol, etc., unsaturated epoxides such as vinyl cyclohexene mono- and dioxides, butadiene monoxide, allyl glycidyl ether, etc., and halogen-containing epoxides such as epichlorohydrin, epibromohydrin, epifluorohydrin, trifluoromethyl ethylene oxide, perfluoropropylene oxide, perfluoroethylene oxide, etc.

Any hydrocarbonaluminum compound that has been reacted as set forth above with a basic nitrogen-containing compound may be used as a catalyst for this invention. Thus, any aluminum compound having the formula $AlR_3$ where at least one R is a hydrocarbon radical and the remaining R's are hydrogen or hydrocarbon may be used. Exemplary of these hydrocarbonaluminum compounds are trialkylaluminums such as triethyaluminum, tripropylaluminum, tri-n-butylaluminum, triisobutylaluminum, trihexylaluminum, trioctylaluminum, etc.; alkylaluminum hydrides such as diethylaluminum hydride, diisobutylaluminum hydride, etc.; or any mixture of these aluminum compounds and the corresponding alkenyl, cycloalkyl, cycloalkenyl, aryl and aralkyl aluminum compounds as, for example, triisoprenylaluminum, tricyclohexylaluminum, tricyclohexenylaluminum, triphenylaluminum, tribenzylaluminum, etc.

As pointed out above, the hydrocarbonaluminum compound used as the catalyst in accordance with this invention is reacted with ammonia, an amine or any other organic basic nitrogen compound. Any organic compound containing basic nitrogen, and wherein any active hydrogen present in the normal state of the compound is that attached to said nitrogen, may be used to react with the hydrocarbonaluminum compound. Thus, for example, compounds such as acetamide, succinimide, etc., have active hydrogen in addition to that attached to nitrogen only in their enolized state, whereas in their normal state the only active hydrogen present is that attached to nitrogen. Hence, such compounds fall within the scope of the above-defined class. Exemplary of the nitrogen compounds that may be used are ammonia, amines, including saturated and unsaturated aliphatic, saturated and unsaturated alicyclic, heterocyclic, and aromatic amines, which in turn may be primary, secondary or tertiary amines, monoamines, diamines, etc., amides including aliphatic, cycloaliphatic and aromatic amides, which may in turn be N-mono- or di-substituted amides, amidines, imides, imines, cyclic imines, hydrazine, alkyl hydrazine, ureas, etc. Exemplary of these compounds are ethylamine, butylamine, diethylamine, triethylamine, tributylamine, diethylenetriamine, triethylenediamine, cyclohexylamine, pyridine, piperidine, morpholine, 2,6-dimethylmorpholine, N-methylpyrrolidine, N-methylmorpholine, quinoline, o-phenanthroline, formamide, dimethylformamide, acetamide, benzamidine, succinimide, maleimide, phthalimide, ethyleneimine, hexamethylenimine, urea, methylurea, dimethylurea, diethylurea, dibutylurea, etc.

Just how the ammonia or organic basic nitrogen compound acts to bring about the increase in the catalytic activity of the hydrocarbonaluminum compound is not known. Whether it is a true chemical reaction or some type of complex formation is not known. Whatever the mechanism may be, the mole ratio of the ammonia, amine, or other organic basic nitrogen compound that is reacted with the aluminum compound to produce the catalyst of this invention is critical and must be within a molar range such that the ratio of nitrogen to aluminum is from about 0.01:1 to about 0.95:1, and preferably is within the range of from about 0.05:1 to about 0.5:1. Thus, for ammonia or a monoamine the molar ratio of amine to aluminum compound is 0.01 to 0.95; for a diamine the molar ratio is 0.005 to 0.48; and for a triamine, 0.0033 to 0.32, etc. When the mole ratio of the nitrogen compound to the aluminum compound exceeds the above limitation, the catalytic activity of the reaction product is greatly reduced, if not completely erased. The reaction product between the hydrocarbonaluminum compound and the amine which forms the catalyst in accordance with this invention is generally prepared by adding the amine to a hydrocarbon solution of the hydrocarbonaluminum compound. Usually this reaction is carried out at room temperature or below, but higher temperatures may be used if desired. The catalyst may also be prepared in situ by the addition of one of the catalyst components to a solution of the monomers followed by the addition of the second catalyst component or simultaneous addition of both the catalyst components.

In some cases an even further improvement in the catalytic activity of the aluminum compound can be obtained by additionally reacting the aluminum compound with water. This may be done at the same time the hydrocarbonaluminum compound is reacted with the nitrogen compound or subsequently thereto. The amount of water reacted, if used, should be within the range of from about 0.01 to about 1 mole of water per mole of aluminum and preferably from about 0.01 to about 0.5 mole per mole of aluminum.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced or raised to a convenient level by adjusting the pressure) so as to remove the heat of reaction. It may also be carried out in the presence of an inert diluent. Any diluent that is inert under the polymerization reaction conditions may be used as, for example, ethers such as the dialkyl, aryl or cycloalkyl ethers such as diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc. Obviously, any mixture of such diluents may be used and in many cases is preferable. The polymerization process may also be carried out in the presence of additives such as antioxidants, carbon black, zinc stearate, sulfur, some accelerators and other curatives, etc.

Any amount of the hydrocarbonaluminum-nitrogen compound reaction product prepared as described above may be used to catalyze the process in accordance with this invention from a minor catalytic amount up to a large excess, but in general will be within the range of from about 0.2 to about 10 mole percent of the aluminum compound based on the monomer being polymerized, and preferably will be within the range of from about 0.5 to about 5 mole percent. The amount of catalyst used depends in part on such factors as monomer purity, diluent purity, etc., less pure epoxides requiring more catalyst to destroy reaction impurities. In order to decrease catalyst consumption it is generally preferred that impurities such as carbon dioxide, oxygen, halides, alcohols, etc., be kept at as low a level as practical.

The polymerization process in accordance with this invention may be carried out over a wide temperature range and pressure. Usually it will be carried out at a temperature from about −80° C. up to about 150° C., preferably within the range of from about −50° C. to about 120° C., and more preferably from about −30° C. to about 100° C. Usually, the polymerization process will be carried out at autogenous pressure, but superatmospheric pressures up to several hundred pounds may be used if desired, and in the same way, subatmospheric pressures may also be used.

The following examples exemplify the improved results that may be obtained on polymerizing epoxides in accordance with this invention. All parts and percentages are by weight unless otherwise indicated. As will be seen from these examples, the process of this invention makes it possible to not only obtain greatly improved yields of polymer, but makes it possible to produce polymers of exceptionally high molecular weight. The molecular weight of the polymers produced in these examples is shown by the reduced specific viscosity (RSV) given for each. By the term "reduced specific viscosity" is meant the $\eta$ sp/C determined on a 0.1% solution of the polymer in a given diluent at a given temperature.

Examples 1-6

In each of these examples a solution of the catalyst was prepared by injecting a given amount of triethylamine into a 0.5 M solution of triisobutylaluminum in heptane under a nitrogen atmosphere. A nitrogen-filled polymerization vessel, equipped with an agitator, was charged with 5.0 g. of ethylene oxide and 18 g. of heptane. With the temperature adjusted to 0-5° C., an amount of the catalyst solution equal to 1 millimole of aluminum was added. Within a few minutes a finely divided slurry of poly(ethylene oxide) was formed. Agitation was continued at 0-5° C. for 3 hours, after which the temperature was allowed to rise to room temperature and agitation was continued for 16 hours. At this point the polymerization was stopped by adding about 3 g. of anhydrous ethanol. The reaction mixture was diluted with 80 g. of heptane, and the voluminous slurry was collected and washed several times with heptane. The poly(ethylene oxide) was then digested in ether containing 0.4% Santonox, i.e. 4,4'-thiobis(6-tert-butyl-m-cresol), for 30 minutes after which it was again collected and dried under vacuum at 45° C. The polymer in each case was a free-flowing, granular solid. Tabulated below is the mole ratio of triisobutylaluminum to triethylamine used as the catalyst, the percent conversion to polymer and the RSV (chloroform at 25° C.) of the poly(ethylene oxide) obtained.

| Ex. No. | Al:Amine Molar Ratio | Percent Conv. | RSV |
|---|---|---|---|
| 1 | 1:0.01 | 13.8 | 2.0 |
| 2 | 1:0.025 | 36.8 | 2.4 |
| 3 | 1:0.05 | 80 | 1.4 |
| 4 | 1:0.15 | 75 | 0.73 |
| 5 | 1:0.25 | 88 | 0.39 |
| 6 | 1:0.5 | 88.5 | 0.50 |

These examples demonstrate how the molecular weight of the polymer can be controlled by varying the mole ratio of amine to aluminum compound.

Examples 7-12

Ethylene oxide was polymerized following the general procedure described for Examples 1-6 but using as the catalysts triisobutylaluminum which had been reacted with various amines. Tabulated below is the amine used, mole ratio of triisobutylaluminum to amine, the percent conversion to polymer and the RSV (chloroform at 25° C.) of the poly(ethylene oxide) obtained.

| Ex. No. | Amine | Al:Amine Molar Ratio | Percent Conv. | RSV |
|---|---|---|---|---|
| 7 | N-methyl morpholine | 1:0.1 | 87.5 | 1.1 |
| 8 | Triethylenediamine | 1:0.3 | 85.9 | 0.65 |
| 9 | N-methylpyrrolidine | 1:0.1 | 89.0 | 1.1 |
| 10 | Pyridine | 1:0.3 | 72.3 | 0.49 |
| 11 | Piperidine | 1:0.1 | 90.1 | 1.2 |
| 12 | Diethylamine | 1:0.18 | 76.5 | 1.5 |

Example 13

Into a polymerization vessel containing 5 g. of ethylene oxide in about 20 g. of heptane under a nitrogen atmosphere at room temperature, was injected a catalyst which had been prepared by reacting 1 millimole of triisobutylaluminum with 0.3 millimole of morpholine in 2 g. of heptane. A vigorous exothermic reaction took place within a few minutes, and the temperature of the vessel rose to about 60° C. with a gummy polymer being deposited. After the initial reaction, the temperature gradually dropped and the contents of the vessel were agitated for 18 hours. The polymerization was stopped by adding 3 g. of anhydrous ethanol. The contents of the vessel were transferred to a high-speed blendor diluted with 80 g. of heptane, and the polymer was beaten to a finely divided solid. The solid was collected, washed several times with heptane and finally was stabilized with Santonox as described in Example 1. The poly(ethylene oxide) so obtained was a white solid, amounting to a conversion of 75.3% and which had a RSV of 0.45 (chloroform at 25° C.).

Example 14

Example 13 was repeated except that the catalyst used in this case was prepared by reacting 1 millimole of triethylaluminum with 0.3 millimole of morpholine. The rate of polymerization was slower, and a suspension of the polymer was formed over the next 20 hours. It was isolated, and there was obtained an 81% conversion of powdery, solid poly(ethylene oxide) having an RSV or 0.38 in chloroform at 25° C.

*Example 15*

Example 13 was repeated except that in this case the catalyst used was prepared by reacting 1 millimole of triethylaluminum with 0.35 millimole of 2,6-dimethyl morpholine. The poly(ethylene oxide) so obtained amounted to a conversion of 89% which had an RSV of 0.46 as measured in chloroform at 25° C.

*Example 16*

Example 13 was repeated except that the catalyst used in this case was prepared from 1 millimole of triisobutylaluminum and 0.35 millimole of 2,6-dimethyl morpholine, and the diluent used for the polymerization was toluene. In this case the solution formed and became viscous within 15 minutes. After 20 hours the polymerization was stopped by adding 3 g. of anhydrous ethanol, and the reaction mixture was diluted with 80 parts of heptane, and the polymer isolated as in Example 13. The poly(ethylene oxide) so obtained amounted to a conversion of 72%, and it had an RSV of 0.75 (as measured in chloroform at 25° C.).

*Example 17*

A nitrogen-filled polymerization vessel equipped with an agitator was charged with 5 g. of ethylene oxide and 18 g. of heptane. With the vessel and contents at room temperature there was injected 1 millimole of triisobutylaluminum dissolved in 1 milliliter of heptane. No reaction was apparent after two hours. The vessel and contents were then cooled to 0–5° C., and 0.25 millimole of triethylamine was injected. Within 5 minutes a slurry of polymer particles formed. After another 18 hours the polymer was isolated as described in Example 1. The poly(ethylene oxide) so obtained amounted to a conversion of 80% and had an RSV of 0.55 (chloroform at 25° C.).

*Example 18*

A polymerization vessel equipped with an agitator was charged with 5 g. of ethylene oxide and 16 g. of heptane. With the vessel and contents at 0° C. there was injected 0.25 millimole of triethylamine followed by 0.2 millimole of triisobutylaluminum added as a 0.2 M solution in heptane. After 2 hours no polymer had formed. Accordingly, an additional 0.4 millimole of triisobutylaluminum was added. After a total time of 20 hours, the polymer was isolated as described in Example 1. There was obtained an amount of poly(ethylene oxide) equal to an 89% conversion, and it had an RSV of 0.63 (chloroform at 25° C.).

*Example 19*

A nitrogen-filled polymerization vessel was charged with 10 g. of epichlorohydrin and 44 g. of toluene. With the temperature at 30° C. there was then injected a catalyst comprising a mixture of 2 millimoles of triisobutylaluminum and 0.8 millimole of triethylamine in 3 g. of heptane. The contents of the vessel were agitated at 30° C. for 18 hours, the solution becoming viscous within an hour. The polymer was isolated by diluting the reaction mixture with 4 volumes of diethyl ether. The solidified product was separated and then treated in a blendor with 150 g. of anhydrous ethanol followed by the addition of 10 g. of a 10% solution of hydrogen chloride in methanol. After this the polymer was separated, washed free of acid with alcohol, then washed once with a 0.4% solution of Santonox in methanol and then dried for 16 hours at 80° C. in vacuum. The poly(epichlorohydrin) so obtained amounted to a conversion of 77%. It was an essentially amorphous polymer and had an RSV of 3.7 (0.1% in α-chloronaphthalene at 100° C.).

*Example 20*

Example 19 was repeated except that the catalyst used in this case was a mixture of 2 millimoles of triisobutylaluminum and 0.8 millimole of dimethylformamide in 3 g. of heptane. The poly(epichlorohydrin) so obtained was amorphous and was isolated in a 56% conversion. It had an RSV of 1.6 (α-chloronaphthalene at 100° C.).

*Example 21*

A polymerization vessel with a nitrogen atmosphere was charged with 65 g. of n-heptane and 10 g. of propylene oxide. After equilibrating the vessel and contents at 30° C., a solution of the catalyst was injected. The catalyst solution was prepared by mixing 2 millimoles of triisobutylaluminum in 2.8 g. of n-heptane under nitrogen with 0.8 millimole of triethylamine and agitating the mixture at 30° C. for one hour. The polymerization reaction mixture was agitated for 19 hours at 30° C. The poly(propylene oxide) so obtained was a tacky, soft solid material which amounted to a conversion of 99% based on a total solids.

*Example 22*

Example 21 was repeated except that the monomer charge was 9.5 g. of propylene oxide and 0.5 g. of allyl glycidyl ether. At the end of 19 hours at 30° C. there was added to the reaction mixture 1% of phenyl-β-naphthylamine based on the weight of the monomers added, and then the diluent was distilled off and the product dried for 16 hours at 80° C. under vacuum. The copolymer of propylene oxide and allyl glycidyl ether so obtained amounted to a conversion of 100% and had an RSV of 0.76 as measured on a 0.1% solution in benzene at 25° C.

*Example 23*

Example 21 was repeated except that the monomer charge was 8.0 g. of epichlorohydrin and 2.0 g. of propylene oxide and the diluent used was 40 g. of toluene instead of n-heptane. After 19 hours at 30° C. there was obtained a 26% conversion to epichlorohydrin-propylene oxide copolymer which was a tacky, soft rubber.

*Example 24*

A nitrogen-filled polymerization vessel was charged with 10 g. of epichlorohydrin and 40 g. of toluene. With the temperature at 30° C. there was then injected the catalyst solution which had been prepared by reacting 2 millimoles of triisobutylaluminum in 2.8 g. of n-heptane with 0.8 millimole of phthalimide and agitating the mixture for one hour at 30° C. The polymerization reaction was run for 19 hours at 30° C. At the end of this time 4 volumes of n-heptane was added followed by an addition of 40 g. of diethyl ether. The ether-insoluble polymer was then collected, washed twice with ether and then purified by slurrying it with a 1% solution of hydrogen chloride in ethanol. It was again collected, washed with methanol until neutral, then with a 0.4% solution of 4,4'-thiobis(6-tert-butyl-m-cresol) in methanol, and finally it was dried for 16 hours at 80° C. under vacuum. The poly(epichlorohydrin) so obtained had an RSV of 4.8 as measured on a 0.1% solution of the polymer in α-chloronaphthalene at 100° C.

*Example 25*

Example 24 was repeated except that the catalyst in this case was prepared by reacting 2 millimoles of triisobutylaluminum in 2.8 g. of n-heptane with 0.8 millimole of 1,1-dibutyl urea at 30° C. and agitating for one hour. The poly(epichlorohydrin) so produced had an RSV of 3.1 as measured on a 0.1% solution in α-chloronaphthalene at 100° C.

Example 26

A nitrogen-filled polymerization vessel was charged with 28.5 g. of n-heptane and 10 g. of ethylene oxide. With the temperature at 30° C. there was then injected the catalyst solution which was prepared by mixing 4 millimoles of triisobutylaluminum in 5.6 g. of n-heptane with 1.6 millimoles of n-butylamine and agitating the mixture for one hour at 30° C. After 19 hours at 30° C. the poly(ethylene oxide) produced was isolated by adding an excess of ether to the reaction mixture, separating the ether-insoluble polymer by filtration, washing it with ether, then with 0.5% hydrogen chloride in an 80:20 mixture of ether-methanol, then with the ether-methanol alone, and finally with ether containing 0.5% of 4,4'-thiobis(6-tert-butyl-m-cresol). The polymer was then dried for 16 hours at 50° C. under vacuum. The ether-insoluble poly(ethylene oxide) obtained amounted to a conversion of 93% and had an RSV of 0.6 as measured on a 0.1% solution in chloroform at 25° C.

Example 27

Example 26 was repeated except that the catalyst used in this case was prepared by mixing 4 millimoles of diisobutylaluminum hydride with 2 millimoles of ammonia. After 20 hours at 30° C. the polymerization was stopped and the ether-insoluble poly(ethylene oxide) was isolated. There was obtained an 88% conversion to ether-insoluble polymer which had an RSV of 1.9 as measured on a 0.1% solution in chloroform at 25° C.

Example 28

Epichlorohydrin was polymerized as described in Example 24 except that the diluent used in this case was 20.5 g. of n-heptane, and the catalyst used was formed by mixing 0.32 g. of o-phenanthroline monohydrate (1.6 millimoles of o-phenanthroline and 1.6 millimoles of water) and 2.6 g. of diethyl ether with 4 millimoles of triisobutylaluminum dissolved in 2.1 g. of n-heptane, the mixing being carried out under a nitrogen atmosphere in the presence of glass beads at 0° C., and the mixture then agitated for 20 hours at 30° C. before using the catalyst. The poly(epichlorohydrin) so obtained was a tough rubber and amounted to a conversion of 72%. It had an RSV of 2.3 as measured on a 0.1% solution in α-chloronaphthalene at 100° C.

What we claim and desire to protect by Letters Patent is:

1. The process of preparing poly(epoxides) which comprises polymerizing epoxides, wherein the epoxy group is an oxirane ring, by contacting at a temperature of from about −80° C. to about 150° C. at least one of said epoxides with the catalyst formed by reacting a hydrocarbonaluminum compound, selected from the group consisting of trialkylaluminums and dialkylaluminum hydrides, with a nitrogen compound selected from the group consisting of ammonia and organic basic nitrogen-containing compounds selected from the group consisting of amines, carboxamides, carboximides, urea and alkyl substituted ureas, wherein any active hydrogen in said organic compounds is that attached to nitrogen, in a molar ratio such that the ratio of nitrogen to aluminum is within the range of from about 0.01 to 0.95, said nitrogen compound being a nonchelating compound with the hydrocarbon aluminum compound, said epoxides being free of groups other than oxirane groups which are reactive with said hydrocarbonaluminum catalyst.

2. The process of claim 1 wherein the nitrogen compound is ammonia.
3. The process of claim 1 wherein the nitrogen compound is an amine.
4. The process of claim 1 wherein the nitrogen compound is a carboxamide.
5. The process of claim 2 wherein the aluminum compound is a trialkylaluminum.
6. The process of claim 2 wherein the aluminum compound is a dialkylaluminum hydride.
7. The process of claim 3 wherein the aluminum compound is a trialkylaluminum.
8. The process of claim 4 wherein the aluminum compound is a trialkylaluminum.
9. The process of claim 6 wherein the epoxide is an alkylene oxide.
10. The process of claim 7 wherein the epoxide is an alkylene oxide.
11. The process of claim 7 wherein the epoxide is an epihalohydrin.
12. The process of claim 8 wherein the epoxide is an alkylene oxide.
13. The process of claim 10 wherein the amine is a secondary amine.
14. The process of claim 10 wherein the amine is a tertiary amine.
15. The process of claim 11 wherein the amine is a tertiary amine.
16. The process of polymerizing ethylene oxide which comprises contacting at a temperature of from about −80° C. to about 150° C. ethylene oxide with diisobutylaluminum hydride reacted with ammonia in a molar ratio of from about 1:0.01 to about 1:0.95.
17. The process of polymerizing ethylene oxide which comprises contacting at a temperature of from about −80° C. to about 150° C. ethylene oxide with a triisobutylaluminum reacted with piperidine in a molar ratio of from about 1:0.05 to about 1:0.5.
18. The process of polymerizing ethylene oxide which comprises contacting at a temperature of from about −80° C. to about 150° C. ethylene oxide with a triisobutylaluminum reacted with triethylamine in a molar ratio of from about 1:0.05 to about 1:0.5.
19. The process of polymerizing epichlorohydrin which comprises contacting at a temperature of from about −80° C. to about 150° C. epichlorohydrin with triisobutylaluminum reacted with triethylamine in a molar ratio of from about 1:0.05 to about 1:0.5.
20. The process of polymerizing ethylene oxide which comprises contacting at a temperature of from about −80° C. to about 150° C. ethylene oxide with a triisobutylaluminum reacted with dimethylformamide in a molar ratio of from about 1:0.05 to about 1:0.5.
21. The process of claim 1 wherein the ratio of nitrogen to aluminum is within the range of from about 0.05 to about 0.5.

References Cited by the Examiner
UNITED STATES PATENTS
2,870,100  1/59  Stewart et al. _____ 260—2

OTHER REFERENCES

Flory: "Principles of Polymer Chemistry," Cornell University Press, Ithaca, N.Y., 1953, page 59.

WILLIAM H. SHORT, *Primary Examiner.*

H. N. BURNSTEIN, *Examiner.*